2,807,620

MANUFACTURE OF BRANCHED CHAIN SULFENAMIDES

Robert H. Cooper, Nitro, and John J. D'Amico, Charleston, W. Va., assignors to Monsanto Chemical Company, St. Louis, Mo., a corporation of Delaware No Drawing. Application December 22, 1955, Serial No. 554,608

4 Claims. (Cl. 260—306.6)

The present invention relates to the manufacture of sulfenamides and particularly to benzothiazolesulfenamides in highly satisfactory yield and of excellent purity, especially as regards freedom from ordinarily occurring disulfide side reaction products. The improvements in the present invention, as hereinafter set forth in more detail, apply more specifically in the case of certain aliphatic amines, the benzothiazolesulfenamides of which, heretofore, have not been obtainable in a state of satisfactory purity and storage stability by methods previously described.

The commercial importance of the benzothiazolesulfenamides as accelerators of the rubber vulcanization process is well known. For more satisfactory results from such use however, the aforesaid accelerators must be of as high purity as is commercially feasible, and, of most importance, must be of sufficient stability as not to undergo deleterious breakdown in normal storage time to produce unwanted products. It has been noted that such breakdown appears to be a concomitant property with the initial disulfide content of the sulfenamide. The higher the initial disulfide content, the more rapid is the increase with time of the amount of disulfide present, with a resulting change in the physical and chemical properties of the resulting mixture of products. When the disulfide content increases from an initial low quantity to from about 8 to 15% by weight, the appearance has not in many cases materially altered, but the mixture is greasy to the feel, does not pour freely as does a dry crystal, is lowered in melting point and differs in accelerating activity from the freshly produced product of normally low disulfide content. Obviously it is much more desirable to obtain the sulfenamides initially in as pure a state as possible.

The conditions requisite for the production of sulfenamide by the preferred new process are apparent from the following example. In a jacketed reaction vessel of suitable size and of acid resisting composition, and equipped with temperature recording means, mechanical agitation and connected with an auxiliary metal tank for containing oxidizing solution, there are added 632 parts (0.5 mole) of sodium mercaptobenzothiazole solution (13.25% concentration mercaptobenzothiazole). Additionally, for recording the pH of the reacting mixture, in order to control the course of and the end of the reaction, the reactor has installed an antimony-calomel electrode in connection with a suitable potentiometer. To the benzothiazole solution there were added 55 parts (0.75 mole) of tertiary-butylamine. The quantity of amine preferred is approximately 50% in excess of that required for the reaction but is necessary to avoid formation of undesired products. Substantially all the excess amine is, of course, recoverable at the end of the reaction period. This amine preferably is added to the thiazole at a slow rate over a period of time while agitating the mixture. At this stage of the process the pH of the mixture was 12.5 and the millivolt reading 710. After the amine was all added, agitation was continued for from 15 to 30 minutes whereupon 141 parts (0.36 mole) of 25% sulfuric acid were added over a period of 15–30 minutes. After all the acid had been added, the pH reading was 10.3 at 580 millivolts. The mixture was then heated to and maintained between 45–50° C. and, after agitating for approximately 30 minutes, there were added 292 parts (0.6 mole) of a 15.25% by weight solution of sodium hypochlorite. The hypochlorite, which is approximately 20% theory excess, was added over about a two hour period, while agitating and maintaining the temperature limits set forth. A break in potential indicated an excess of hypochlorite, whereupon hypochlorite addition was discontinued and the mixture agitated at 45–50° C. for approximately an hour. During this period the reaction mixture should be positive to starch-iodide paper. If at any time a positive reaction is not obtained, additional hypochlorite should be added. A small amount (2 parts) of sodium sulphite was then added to destroy any excess hypochlorite. The mass was then cooled to about room temperature, and the solid product collected by suitable means, such as by centrifuging, washed and dried at a temperature of not over 50° C. The product, tert-butyl-2-benzothiazolesulfenamide, was obtained in several duplicating experiments in about 94% theory yield, melted at 110–111° C. and was free of disulfide.

In a like manner, using isopropylamine while employing the same molar ratio and excess of reactants and similar agitation and temperature conditions as previously set forth in detail, N-isopropyl-2-benzothiazolesulfenamide was obtained as a light tan product in 93–95% theory yield, free of disulfide impurities and melting at 91–92° C.

The conditions imposed and set forth in some detail in the foregoing example have been found to be critical. A lower oxidizing temperature, a smaller excess of amine (15 to 40%), less than about 1.3 or more than about 1.5 molecular equivalents of acid per mole of sodium mercaptobenzothiazole, and a lower concentration of sodium mercaptobenzothiazole solution all result in a product of lower melting point, of appreciable to high disulfide content and a lower yield of product. Complete agitation and thorough mixture of the reactants at all stages and particularly when all reactants are present, are also essential. Good results may be obtained by carrying out the reaction within the range of 45–65° C. but these are about the operating limits. Between 65–70° C. and below 45° C. the yields decline. A series of experiments at 48–65° C. gave excellent yields. The concentration of sodium mercaptobenzothiazole may be increased with advantage so long as the reaction mixtures do not become so thick as to interfere with agitation.

The sensitivity to amount of acid is illustrated by the following table. The results were obtained using tertiary-butyl-amine reacted as described in the foregoing example except that the ratio of acid varied. Since sulfuric acid is dibasic, the moles of acid were multiplied by two and divided by the number of moles of sodium mercaptobenzothiazole to express the acid as molecular equivalents of mineral acid per mole of sodium mercaptobenzothiazole.

| Molecular equivalent of mineral acid per mole of sodium mercaptobenzothiazole | Percent yield | Percent disulfide |
|---|---|---|
| 1.08 | 86 | 0 |
| 1.20 | 89 | 0 |
| 1.40 | 93.4 | 0 |
| 1.46 | 94.5 | 0 |
| 1.68 | 88 | 1.64 |

Mineral acid within the range of 1.3–1.5 molecular equivalents per mole of sodium mercaptobenzothiazole, essential for high yields from lower branched chain amines, corresponds to a pH of about 10.1 to 10.7.

Yields may be increased a further 2.5%–3.0% by modifying the above described procedure as follows: Just enough acid is added to sodium mercaptobenzothiazole solution to precipitate free mercaptobenzothiazole. The pH should be slightly on the alkaline side, as for example in the range of 7 to 8. The amine is then added, the mixture stirred and heated a few (15) minutes and then the remainder of the acid added to give a pH of about 10.3. The reaction mixture so prepared is then oxidized and the product isolated all as described above. The yield was 97.2% of a product containing only 0.16% disulfide. Operating in this manner a larger particle size is obtained providing the oxidation is effected at 55–65° C. This yielded a filter cake containing about 22–30% water as compared to 33–43% depending upon the temperature of oxidation, when the acid is added all at once.

It is apparent that an improved process for the commercial manufacture of branched chain aliphatic amine benzothiazolesulfenamides has been provided by the present invention. Products of high initial purity are obtained and since this is the case, the normal stable storage life of the products is increased to a point that the products are commercially feasible for uses that employ their valuable rubber vulcanization accelerating properties.

It is intended to cover all changes and modifications of the examples of the invention herein chosen for purposes of disclosure which do not constitute departures from the spirit and scope of the invention.

The present application is a continuation-in-part of copending application Serial No. 439,922, filed June 28, 1954, now abandoned.

What is claimed is:

1. The method of making a disulfide-free condensation product of 2-mercaptobenzothiazole and a lower branched chain aliphatic primary amine which comprises oxidizing at a temperature of 45–65° C. in aqueous medium by means of a hypochlorite, a mixture of one molecular proportion of at least a 13% aqueous solution of 2-mercaptobenzothiazole in the form of the sodium salt, an excess sufficient to provide optimum yield not more than one and one-half molecular proportions of an amine selected from the group consisting of isopropylamine and tertiary-butylamine and mineral acid within the range of 1.3–1.5 molecular equivalents.

2. The method of making tertiary-butyl-2-mercaptobenzothiazolesulfenamide which comprises slowly adding one and one-half molar proportions of tertiary-butylamine to one molecular proportion of a 13–20% aqueous solution of 2-mercaptobenzothiazole in the form of the sodium salt at a slow rate and with agitation, adjusting the pH of the mixture to 10.3 by the addition of sulfuric acid, heating the solution to a temperature of 45–50° C. and maintaining the temperature thereat, slowly adding with continuing agitation approximately a 20% molar excess of sodium hypochlorite solution, continuing agitation and the stated temperature after oxidation is complete and filtering, washing and drying the product.

3. The process of claim 1 in which the solution for oxidation is prepared by adding enough mineral acid to sodium mercaptobenzothiazole solution to give a pH within the range of 7 to 8, adding the amine and then the remainder of the acid.

4. The process of claim 1 in which the solution for oxidation is prepared by adding enough mineral acid to sodium mercaptobenzothiazole solution to give a pH within the range of 7 to 8, adding the amine and then the remainder of the acid and the oxidation is effected at 55–65° C.

References Cited in the file of this patent

UNITED STATES PATENTS

| | | |
|---|---|---|
| 2,045,888 | Tschunkur et al. | June 30, 1936 |
| 2,268,467 | Ashworth | Dec. 30, 1941 |
| 2,271,834 | Carr | Feb. 3, 1942 |
| 2,339,002 | Cooper | Jan. 11, 1944 |
| 2,339,552 | Carr | Jan. 18, 1944 |
| 2,382,793 | Howland | Aug. 14, 1945 |
| 2,415,029 | Smith | Jan. 28, 1947 |
| 2,417,989 | Moore et al. | Mar. 25, 1947 |